(12) United States Patent
Poe et al.

(10) Patent No.: US 11,520,862 B2
(45) Date of Patent: Dec. 6, 2022

(54) CONTROL OF APPLICATIONS BASED ON LICENSING OBJECTS

(71) Applicant: Hewlett-Packard Development Company, L.P., Spring, TX (US)

(72) Inventors: Daryl T. Poe, Fort Collins, CO (US); Matthieu Clemenceau, Spring, TX (US); Xinwei Zhang, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/733,959

(22) PCT Filed: Feb. 1, 2019

(86) PCT No.: PCT/US2019/016415
§ 371 (c)(1),
(2) Date: Dec. 1, 2020

(87) PCT Pub. No.: WO2020/159551
PCT Pub. Date: Aug. 6, 2020

(65) Prior Publication Data
US 2021/0349972 A1    Nov. 11, 2021

(51) Int. Cl.
*G06F 21/10* (2013.01)
*H04L 9/08* (2006.01)
*G06Q 30/00* (2012.01)

(52) U.S. Cl.
CPC .......... *G06F 21/105* (2013.01); *H04L 9/0825* (2013.01); *G06F 2221/0773* (2013.01); *G06Q 30/016* (2013.01); *G06Q 30/018* (2013.01); *G06Q 2220/18* (2013.01)

(58) Field of Classification Search
CPC ................... G06F 21/105; G06F 21/64; G06F 2221/0773; G06F 2221/0757; G06F 2221/2141; G06Q 2220/18; H04L 2463/101; H04L 2209/603; H04L 9/0825
See application file for complete search history.

(56) References Cited

U.S. PATENT DOCUMENTS

| | | | |
|---|---|---|---|
| 7,707,116 B2 | 4/2010 | Walker et al. | |
| 9,003,541 B1* | 4/2015 | Patidar | G06F 21/50 726/26 |
| 9,854,016 B2 | 12/2017 | Chasen et al. | |
| 10,311,237 B2* | 6/2019 | Shah | G06F 21/10 |
| 2002/0107809 A1 | 8/2002 | Biddle et al. | |
| 2002/0120579 A1 | 8/2002 | Kawaguchi et al. | |
| 2005/0114234 A1* | 5/2005 | Thomas | G06F 21/10 705/28 |
| 2005/0289072 A1 | 12/2005 | Sabharwal | |
| 2006/0031222 A1* | 2/2006 | Hannsmann | H04L 63/0428 |
| 2006/0167815 A1 | 7/2006 | Peinado et al. | |
| 2007/0026942 A1* | 2/2007 | Kinsley | G07F 17/3269 463/29 |
| 2007/0168513 A1 | 7/2007 | Weiskopf et al. | |

(Continued)

*Primary Examiner* — Thaddeus J Plecha
(74) *Attorney, Agent, or Firm* — HP Inc. Patent Department

(57) ABSTRACT

An example of a computer-readable medium to store machine-readable instructions. The instructions may cause a processor to verify a licensing object and determine a license has expired. An application may be controlled based on an expiration parameter specific to the licensing object.

16 Claims, 3 Drawing Sheets

```
200
 │
 ▼
┌─────────────────────────────────────────────────────┐
│ Verifying a signature of a licensing object          │─ 210
└─────────────────────────────────────────────────────┘
                         │
                         ▼
┌─────────────────────────────────────────────────────┐
│ Determining that a license of the licensing object   │─ 220
│ has expired                                          │
└─────────────────────────────────────────────────────┘
                         │
                         ▼
┌─────────────────────────────────────────────────────┐
│ Controlling an application based on the determination│
│ and based on an expiration parameter specific to the │─ 230
│ licensing object                                     │
└─────────────────────────────────────────────────────┘
```

(56) References Cited

U.S. PATENT DOCUMENTS

| | | | |
|---|---|---|---|
| 2008/0300887 A1* | 12/2008 | Chen | G06Q 20/12 |
| | | | 705/1.1 |
| 2011/0061047 A1* | 3/2011 | Tyamagondlu | G06F 21/105 |
| | | | 717/177 |
| 2012/0204270 A1* | 8/2012 | Paulino | G06F 21/105 |
| | | | 726/28 |
| 2013/0151861 A1* | 6/2013 | Gan | G06F 21/125 |
| | | | 713/189 |
| 2014/0095394 A1* | 4/2014 | Hughes | G06Q 99/00 |
| | | | 705/59 |
| 2015/0135338 A1 | 5/2015 | Moskal | |
| 2015/0161691 A1* | 6/2015 | Braddy | G06Q 20/127 |
| | | | 705/59 |
| 2016/0381405 A1 | 12/2016 | Smith et al. | |
| 2018/0218466 A1* | 8/2018 | Mowatt | G06Q 50/184 |
| 2018/0329693 A1* | 11/2018 | Eksten | G06F 16/21 |
| 2019/0188362 A1* | 6/2019 | Uchibori | G06F 3/1232 |
| 2020/0183772 A1* | 6/2020 | Bangalore | G06F 11/0793 |

\* cited by examiner

CONTROL OF APPLICATIONS BASED ON LICENSING OBJECTS

BACKGROUND

Applications for computer systems may be licensed for use. A licensing object may be used to verify an application is licensed. The application may reference the licensing object to allow execution of the application. The licensing object may include an expiration time or date, where the application may not properly execute after the licensing object has expired.

BRIEF DESCRIPTION OF THE DRAWINGS

Various examples will be described below referring to the following figures.

DETAILED DESCRIPTION

Licensing objects may be used with an application to verify that the application is licensed for use. The licensing object may include an expiration date or time, after which the application is no longer licensed. An application may be configured to prevent execution of the application, or provide limited functionality, after expiration of the license. Implementing an application to react the same way for all customers on expiration of the customer license may cause issues.

A licensing object may include information regarding how the application will behave after expiration of the license. Licensing objects may be customized to include data specifying different application behavior on expiration of the license for different customers. Different licensing objects with different restrictions may allow an application developer to provide different expiration scenarios to its different customers. Providing and distributing customized licensing objects may be easier than providing customized application distributions. When an application is renewed, the expiration parameters in the licensing object may be modified without modifying the application, though the behavior of the application on expiration may change.

Figure 1:
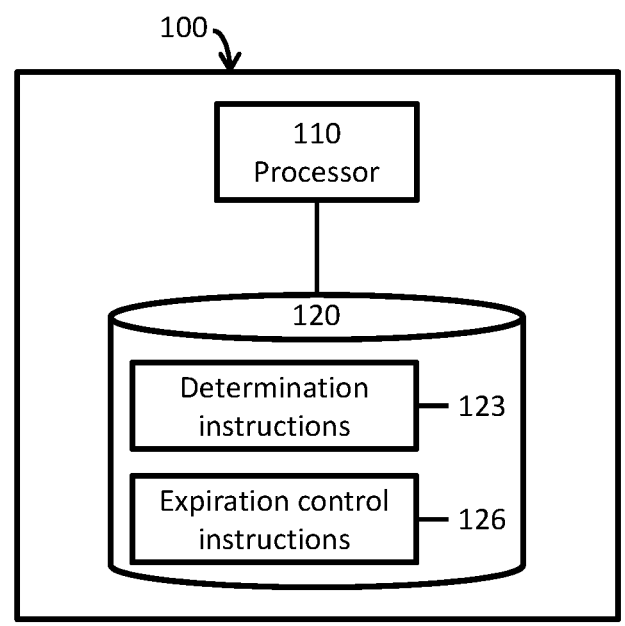
FIG. 1 shows a computer system with determination instructions and expiration control instructions in accordance with various examples.

FIG. 1 shows a computer system 100 with determination instructions 123 and expiration control instructions 126 in accordance with various examples. Computer system 100 includes a processor 110 and storage 120. Storage 120 includes determination instructions 123 and expiration control instructions 126. The determination instructions 123 and expiration control instructions 126 may be executable by the processor 110 to implement methods described herein.

The processor 110 may be coupled to the storage 120, such as via a bus. The processor 110 may comprise a microprocessor, a microcomputer, a microcontroller, a field programmable gate array (FPGA), or discrete logic. The processor 110 may execute machine-readable instructions that implement the methods described herein. The storage 120 may include a hard drive, solid state drive (SSD), flash memory, electrically erasable programmable read-only memory (EEPROM), or random access memory (RAM).

The determination instructions 123 may determine whether or not a license for an application has expired. The expiration may be based on a date and time. The determination instructions 123 may include verification of a licensing object used to determine the expiration of the license.

The expiration control instructions 126 may control the application according to expiration parameters in the licensing object. The expiration parameters may indicate how to control the application after expiration of the license. For example, after expiration, the application may be prevented from being executed. After expiration, the application may still allow execution but send a message to systems administrators that the license has expired. After expiration, the application may still allow execution but disallow use of certain features.

In various examples, the expiration parameters may be included in the licensing object, allowing different licensing objects with different expiration parameters to be provided to different customers for use with the same version of the application. The licensing object may include cryptographic protection to prevent customers from changing the expiration date, expiration parameters, and behavior of the application after expiration. The licensing object may be small relative to the size of the application. While the application may still include instructions to handle the various expiration restrictions specified by the expiration parameters, specifying the expiration parameters in the licensing object may allow all customers to use the same version of the application, yet have different post-expiration behavior based on the licensing object.

In various examples, a developer may provide a long-time customer with a licensing object that allows continued use of the application after expiration of the license, while sending a message to the application developer. This may allow the long-time customer to continue use of the application in case the renewal of the application license was overlooked. The developer may provide a more restrictive licensing object to a different customer that prevents any use of the application after expiration of the license.

Figure 2:
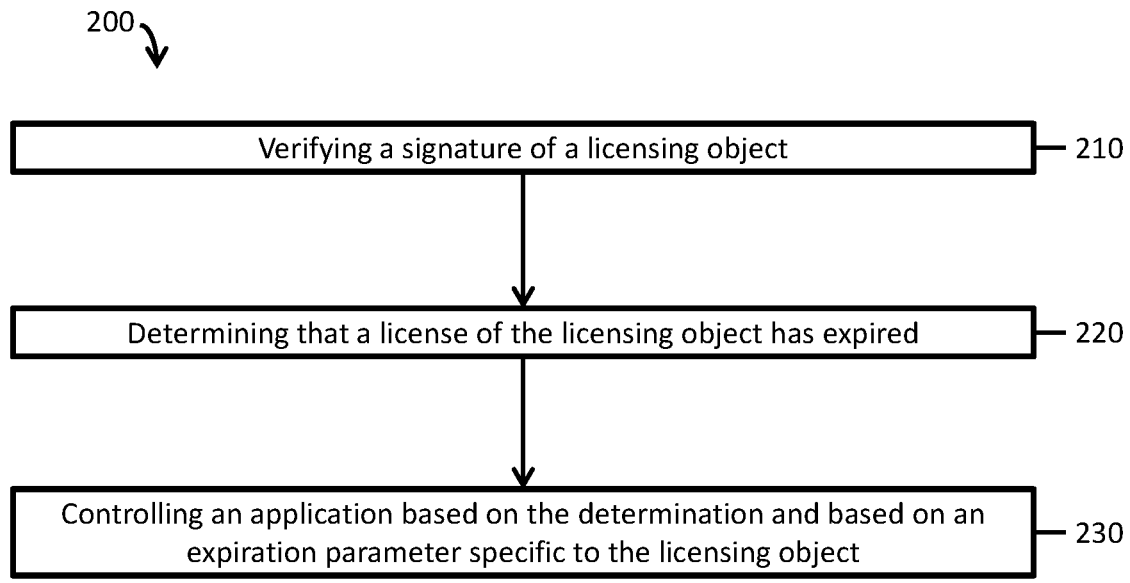
FIG. 2 shows a method of determining that a license has expired and controlling an application based on an expiration parameter in accordance with various examples.

FIG. 2 shows a method 200 of determining that a license has expired and controlling an application based on an expiration parameter in accordance with various examples. Method 200 includes verifying a signature of a licensing object (210). Method 200 includes determining that a license of the licensing object has expired (220). Method 200 includes controlling an application based on the determination and based on an expiration parameter specific to the licensing object (230).

A licensing object may include an expiration date and time for a license to an application. The licensing object may include an expiration parameter specifying how the application should behave once the license has expired. This information may be stored in plaintext so that the expiration and expiration parameters may be readily assessed. To prevent a user from modifying the expiration or expiration parameters, the licensing object could be signed. The signature may be included as part of the licensing object or as a separate object. When the application is to be started, the signature of the licensing object may be verified to ensure the expiration and expiration parameters have not been modified. If the signature is invalid, a message may be provided indicating that the licensing object has become corrupted, and the application may be prevented from being executed. In various examples, the verification of the signature may be performed by the application. The application may provide a message and close in response to a failed verification.

In various examples, a signature may be provided via asymmetric encryption. A private key may be used to generate the signature based on the contents of the licensing object. A public key may be used to verify the signature.

In various examples, the licensing object may be in different formats. The licensing object may be a file on the file system of a computer system. The licensing object may be an entry in a registry of the computer system. The licensing object may be stored in plaintext format with an associated signature. The licensing object may be stored in a binary format. The licensing object may be encrypted, and correctly decrypting the licensing object with the decryption key may verify the licensing object has not been corrupted. The licensing object may be local to the computer system to execute the application, it may be located on a remote computer system that is checked by the local computer system, or it may be provided to the local computer system by a remote computer system when the application is to be executed.

The expiration in the licensing object may be compared against a current date and time to determine if the license has expired. If the license has not expired, the application may be allowed to run as normal. If the license has expired, the application may be controlled based on the expiration parameter in the licensing object. The expiration parameter may be specific to the licensing object, allowing different expiration parameters to be in different licensing objects provided to different users.

The expiration parameter may specify that the application should not be executed. The application may return an error message and terminate its execution. In various examples, a launcher application may be used in conjunction with the application. The launcher application may verify the license file, determine the expiration of the license, and determine whether to execute the desired application. If the expiration parameter specifies the application should not be executed, the launcher application may provide the error and then not execute the application.

The expiration parameter may specify that the application is to be executed, but to disable certain features. This may allow a customer to continue some work before renewing the license, but provide enough restrictions on the application usage to encourage a quick renewal. In various examples, this may be used where the application with the reduced feature set is provided for free. After expiration, the expiration parameters may specify that the application still be allowed to run with the reduced set of free features, but that the license be renewed to re-enable the premium features.

The expiration parameter may specify that a message be provided. The message may include a pop-up or dialog box displayed to a local user. The message may include sending an e-mail or text message. The message may be sent to a systems administrator of the computer system on which the application is to be run. The message may be sent to the developer or licensing authority for the application.

The expiration parameter may specify that the application be allowed to execute without restriction. This condition may be used in conjunction with a notification system or other actions to enforce or encourage renewal of the license. For example, this may be used with a customer using the application in a major system. Disallowing execution due to an unintentional non-renewal may be costly due to the nature of the major system. When used in conjunction with a message sent to the developer, the developer may be informed of the lapse and negotiate with the customer to renew the license.

The expiration parameter may specify a grace period for the application. During the grace period, the application may be allowed to execute without restriction. The grace period may be provided in conjunction with a message, so the user knows they are in the grace period and should renew the license. The grace period may be an amount of time, such as 30 days, or it may be a number of uses, such as executing the application 10 times, or it may allow a total post-expiration runtime, such as allowing a cumulative 3 hours of execution.

In various examples, the licensing object may include multiple expiration times and expiration parameters for an application. This may allow for a staged expiration of the license. For example, a first expiration may be associated with a first expiration parameter. After the first expiration, the user may begin receiving messages that the license has expired. After a later second expiration, an associated second expiration parameter may allow continued execution of the application with a reduced set of features. After a still later third expiration, an associated expiration parameter may prevent execution of the application.

In various examples, the licensing object may include multiple expiration parameters associated with an expiration time. For example, a first expiration parameter may specify a grace period of 30 days. A second expiration parameter may specify that a warning be displayed to the user. A third expiration parameter may specify that data regarding the identification of the computer system be collected and a message be sent to the developer of the application.

In various examples, an expiration parameter may include a time indicator. The time indicator may specify that an action be taken or a restriction enforced once the license has been expired for that amount of time. For example, this may be used in conjunction with messaging. Rather than providing multiple messages as an application is run repeatedly, the messages may provide one message on determining the license has expired and another message some time later. This may be less intrusive where an application is repeatedly run throughout the day and repeated warning messages may be disruptive.

In various examples, the combination of multiple expiration times and multiple expiration parameters may allow a developer to enforce various expiration scenarios for its different customers. Rather than enforcing the same expiration condition across an application's users, customized expiration scenarios may be generated and enforced for the application by modifying the licensing object.

Figure 3:
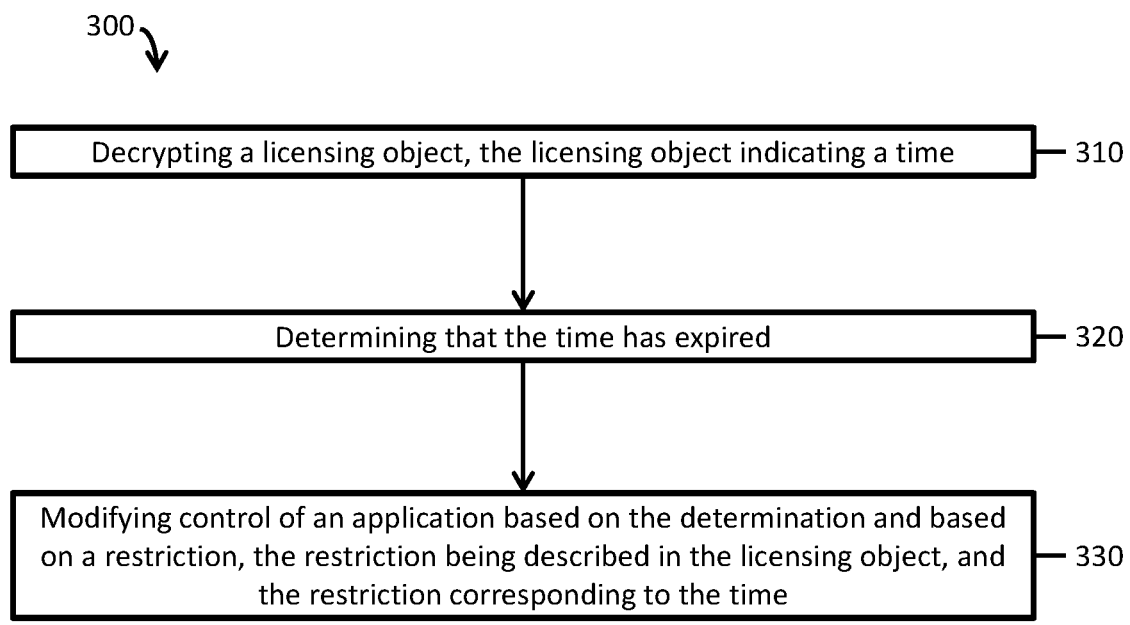
FIG. 3 shows a method of determining that a time has expired and modifying control of an application based on a restriction in accordance with various examples.

FIG. 3 shows a method 300 of determining that a time has expired and modifying control of an application based on a restriction in accordance with various examples. Method 300 includes decrypting a licensing object, the licensing object indicating a time (310). Method 300 includes determining that the time has expired (320). Method 300 includes modifying control of an application based on the determination and based on a restriction, the restriction being described in the licensing object, and the restriction corresponding to the time (330).

The licensing object may include a time indicating an expiration of the license for an application. The expiration parameter may be present in the licensing object and describe a restriction to be enforced after expiration of the license. The application may be controlled based on the restriction to enforce the restriction.

In various examples, the application may store usage data regarding execution of the application after the time in the licensing object has expired. This may be used in connection with a grace period or other allowance of the application to execute. The usage data may be used to help determine conditions for renewal of the license. The conditions may include a fee based on the allowed but unlicensed use of the application between expiration and renewal. The usage data may be used to assist the customer or developer in determining how often the application is used by the customer, which may be used during negotiations to renew the license.

In various examples, the licensing object may be part of a pool of licenses. For example, a customer may license 10 copies of the application, but use them across 50 different computers or employees. The limitation of 10 copies may limit how many copies may simultaneously execute. A central licensing server may keep track of the number of copies in execution and control execution of the application as computer systems request authorization to execute the application.

Figure 4:
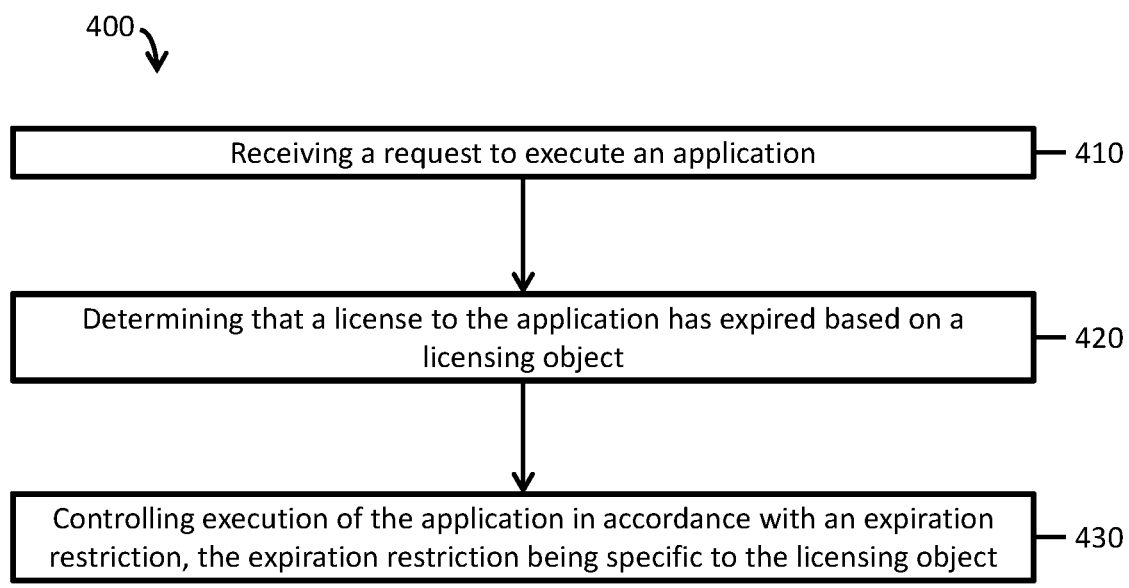
FIG. 4 shows a method of determining a license has expired and controlling execution of an application in accordance with an expiration restriction in accordance with various examples.

FIG. 4 shows a method 400 of determining a license has expired and controlling execution of an application in accordance with an expiration restriction in accordance with various examples. Method 400 includes receiving a request to execute an application (410). Method 400 includes determining that a license to the application has expired based on a licensing object (420). Method 400 includes controlling execution of the application in accordance with an expiration restriction, the expiration restriction being specific to the licensing object (430).

The application may handle licensing issues itself, or licensing issues may be handled through a separate launching or licensing application or a dynamically linked library. A request may be received to execute the application. In various examples, the separate application may handle the licensing issues before beginning execution of the requested application. The separate application may control execution of the requested application through certain application settings or configurations or passing in certain parameters when initializing the requested application. If the licensing object is invalid, or the license has expired and an expiration restriction specifies the requested application is not to be executed, the separate application may prevent the requested application from being executed.

In various examples, a launcher application or licensing application may control execution of multiple other applications. For example, a launcher application may control licensing issues for a suite of office applications, such as a word processor, database, and spreadsheet. The office applications may be separately licensed and include separate licensing objects for handling by the launcher application. The launcher application may allow execution of one of the office applications, but not another, based on multiple expiration restrictions in a licensing object corresponding to the different office applications. The word processor application may be allowed to continue execution without a print feature, based on one expiration restriction, while the database application may be prevented from being executed.

In various examples, the licensing object may be valid for a specific computer system. As part of decrypting or verifying the signature of the licensing object, a unique identifier for the computer system may be involved, such as an identifier of a central processing unit of the computer system or an identifier of the operating system installation. The licensing object may not be valid if copied to a different computer system.

In various examples, a user may be using the application at the time the license expires. The license may be determined to be valid based on the licensing object when the execution begins, thus the application may be allowed to execute. The license may be checked again during execution of the application, and the license may be determined to have expired. Based on the second determination that the license has expired, an expiration restriction may be applied to the execution of the application. The expiration restriction may cause the application to be closed. The licensing object may include an expiration restriction specific to the scenario where the application begins execution while licensed, but the license expires before execution has completed.

The above discussion is meant to be illustrative of the principles and various examples of the present disclosure. Numerous variations and modifications will become apparent to those skilled in the art once the above disclosure is fully appreciated. It is intended that the following claims be interpreted to embrace all such variations and modifications.

What is claimed is:

1. A non-transitory computer-readable medium storing machine-readable instructions that, when executed by a processor, cause the processor to:
    verify a signature of a licensing object;
    determine that a license of the licensing object has expired based on an expiration date, time, or a combination thereof, specific to the licensing object; and
    control an application based on the determination and based on multiple expiration parameters specific to the licensing object, and corresponding to the time, the multiple expiration parameters indicating how to control the application after expiration of the license.

2. The non-transitory computer-readable medium of claim 1, wherein to verify the signature includes to cause the processor to use a public key of an asymmetric encryption.

3. The non-transitory computer-readable medium of claim 1, wherein the licensing object is a licensing file.

4. The non-transitory computer-readable medium of claim 1, wherein to control the application includes to cause the processor to provide a message to a user regarding the determination that the license of the licensing object has expired.

5. The non-transitory computer-readable medium of claim 1, wherein the machine-readable instructions, when executed by the processor, cause the processor to:
    make a second determination that an amount of time has passed after expiration of the licensing object; and
    in response to the second determination that the amount of time has passed, control the application based on a expiration parameter specific to the licensing object.

6. A non-transitory computer-readable medium to storing machine-readable instructions that, when executed by a processor, cause the processor to:
    decrypt a licensing object, the licensing object indicating multiple times;
    determine that a time of the multiple times has expired; and
    modify control of an application based on the determination and based on multiple restrictions, the multiple restrictions being described in the licensing object, and the multiple restrictions corresponding to the time.

7. The non-transitory computer-readable medium of claim 6, wherein to modify control of the application includes to disable a feature of the application.

8. The non-transitory computer-readable medium of claim 6, wherein to determine that the time has expired includes to send a message to a systems administrator.

9. The non-transitory computer-readable medium of claim 6, wherein the computer-readable instructions, when executed by the processor, cause the processor to store usage data regarding a use of the application in response to determining that the time has expired.

10. The non-transitory computer-readable medium of claim 6, wherein the licensing object is from a pool of licensing objects.

11. The non-transitory computer-readable medium of claim 6, wherein the machine-readable instructions, when executed by the processor, cause the processor to:
   make a second determination that a second time of the multiple times has expired; and
   modify control of the application based on the second determination and based on a second restriction, the second restriction corresponding to the second time.

12. A method comprising:
   receiving a request to execute an application;
   determining that a license to the application has expired based on an expiration date and time of a licensing object; and
   controlling execution of the application in accordance with multiple expiration restrictions, the multiple expiration restrictions being specific to the licensing object, and corresponding to the time, wherein the multiple expiration restrictions indicate how to control the application after expiration of the license.

13. The method of claim 12, wherein the controlling execution of the application includes preventing execution of the application.

14. The method of claim 12 comprising:
   receiving a request to execute a second application;
   determining that a second license to the second application has expired based on the licensing object; and
   controlling execution of the second application in accordance with a first expiration restriction, the first expiration restriction being specific to the licensing object, corresponding to the second application, and being distinct from a second expiration restriction.

15. The method of claim 12 comprising verifying the licensing object corresponds to a specific computer system, wherein execution of the application is to be performed by the specific computer system.

16. The method of claim 12 comprising:
   determining that the license to the application is valid based on the licensing object before the determining that the license to the application has expired;
   allowing execution of the application based on the determining that the license to the application is valid; and
   applying the multiple expiration restrictions to the allowed execution of the application in response to determining that the license to the application has expired.

* * * * *